(12) United States Patent
Lee

(10) Patent No.: US 10,755,133 B2
(45) Date of Patent: Aug. 25, 2020

(54) SYSTEM AND METHOD FOR LINE MURA DETECTION WITH PREPROCESSING

(71) Applicant: Samsung Display Co., Ltd., Yongin-si, Gyeonggi-do (KR)

(72) Inventor: Janghwan Lee, Pleasanton, CA (US)

(73) Assignee: Samsung Display Co., Ltd., Yongin-si (KR)

(*) Notice: Subject to any disclaimer, the term of this patent is extended or adjusted under 35 U.S.C. 154(b) by 176 days.

(21) Appl. No.: 15/956,667

(22) Filed: Apr. 18, 2018

(65) Prior Publication Data

US 2019/0258890 A1 Aug. 22, 2019

Related U.S. Application Data

(60) Provisional application No. 62/634,125, filed on Feb. 22, 2018.

(51) Int. Cl.
*G06K 9/00* (2006.01)
*G06K 9/62* (2006.01)
(Continued)

(52) U.S. Cl.
CPC ......... *G06K 9/4609* (2013.01); *G06K 9/6269* (2013.01); *G06K 9/6298* (2013.01);
(Continued)

(58) Field of Classification Search
USPC ................ 382/190, 156, 203, 141; 345/428; 348/125
See application file for complete search history.

(56) References Cited

U.S. PATENT DOCUMENTS 5,917,935 A * 6/1999 Hawthorne ........... G02F 1/1303 348/126
6,154,561 A * 11/2000 Pratt ....................... G06T 7/001 382/141

(Continued)

FOREIGN PATENT DOCUMENTS

JP 2005-140655 6/2005
KR 10-0554578 3/2006

(Continued)

OTHER PUBLICATIONS

Extended European Search Report for corresponding European Patent Application No. 19156268.5, dated Jul. 16, 2019, 9 pages.

(Continued)

*Primary Examiner* — Kathleen Y Dulaney
(74) *Attorney, Agent, or Firm* — Lewis Roca Rothgerber Christie LLP

(57) ABSTRACT

A system and method for identifying line Mura defects on a display. The system is configured to generate a filtered image by preprocessing an input image of a display using at least one filter. The system then identifies line Mura candidates by converting the filtered image to a binary image, counting line components along a slope in the binary image, and marking a potential candidate location when the line components along the slope exceed a line threshold. Image patches are then generated with the candidate locations at the center of each image patch. The image patches are then classified using a machine learning classifier.

20 Claims, 7 Drawing Sheets

(51) Int. Cl.
*G06T 17/00* (2006.01)
*H04N 7/18* (2006.01)
*G06K 9/46* (2006.01)
*G06T 7/00* (2017.01)
*G09G 3/00* (2006.01)

(52) U.S. Cl.
CPC ........... G06T 7/0004 (2013.01); G09G 3/006 (2013.01); *G06K 2209/03* (2013.01); *G06T 2207/20016* (2013.01); *G06T 2207/30121* (2013.01)

(56) References Cited

U.S. PATENT DOCUMENTS

| | | | | |
|---|---|---|---|---|
| 7,593,592 | B2* | 9/2009 | Lesellier | H04N 19/86 |
| | | | | 382/263 |
| 8,026,927 | B2* | 9/2011 | Daly | G09G 3/2007 |
| | | | | 345/428 |
| 8,160,351 | B2* | 4/2012 | Sandstrom | G01N 21/956 |
| | | | | 356/237.4 |
| 8,184,923 | B2* | 5/2012 | Hayakawa | G09G 3/006 |
| | | | | 382/264 |
| 8,743,215 | B1* | 6/2014 | Lee | G09G 3/006 |
| | | | | 348/189 |
| 8,780,097 | B2 | 7/2014 | Xu et al. | |
| 9,164,373 | B2* | 10/2015 | Sandstrom | G03F 7/70425 |
| 2004/0213449 | A1* | 10/2004 | Safaee-Rad | G06T 7/0004 |
| | | | | 382/141 |
| 2005/0007364 | A1* | 1/2005 | Oyama | G02F 1/1309 |
| | | | | 345/428 |
| 2006/0158643 | A1* | 7/2006 | Yoshida | G01N 21/956 |
| | | | | 356/237.5 |
| 2014/0168451 | A1 | 6/2014 | Lee | |

FOREIGN PATENT DOCUMENTS

KR 10-0905155 6/2009
KR 10-2014-0062993 5/2014

OTHER PUBLICATIONS

Yang, Hua, et al.; Transfer-Learning-Based Online Mura Defect Classification, IEEE Transactions on Semiconductor Manufacturing, IEEE Service Center, Piscataway, NJ, US, vol. 31, No. 1, dated Feb. 11, 2018, 8 pages.

* cited by examiner

SYSTEM AND METHOD FOR LINE MURA DETECTION WITH PREPROCESSING

CROSS-REFERENCE TO RELATED APPLICATION(S)

The present application claims priority to, and the benefit of, U.S. Provisional Patent Application No. 62/634,125, filed on Feb. 22, 2018, the contents of which are incorporated herein by reference in its entirety.

BACKGROUND

1. Field

Some embodiments of the present disclosure relate generally to a display defect detection system.

2. Description of the Related Art

As display resolutions and pixel densities have increase, the difficulty in performing defect detection has also increased. Manual defect detection is too time consuming for modern manufacturing facilities, while automated inspection techniques are often ineffective. For example, in automated surface inspection, defects in uniform (e.g. non-textured) surfaces can be easily identified when the local anomalies have distinct contrasts from their regular surrounding neighborhood. Defects in the low-contrast images, however, are difficult to detect when the defects have no clear edges from their surroundings and the background presents uneven illumination.

One common type of display defect is "Mura." Mura is a large category of defects that have a local brightness non-uniformity. Mura can be roughly classified as line Mura, spot Mura, and region Mura depending on the size and general shape of the Mura. Each type of Mura may not have distinct edges and may not be readily apparent in images. Thus, identifying Mura using an automated testing system has proved difficult in the past. A new method of identifying Mura defects is therefore needed.

The above information is only for enhancement of understanding of the background of embodiments of the present disclosure, and therefore may contain information that does not form the prior art.

SUMMARY

Some embodiments of the present disclosure provide a system and method for Mura defect detection in a display. In various embodiments, the system includes a memory and a processor configured to execute instructions stored on the memory. In various embodiments, the instructions cause the processor to generate a filtered image by preprocessing an input image of a display using at least one filter and identify a line Mura candidate. In various embodiments, the system may identify a line Mura candidate by converting the filtered image to a binary image, counting line components along a slope in the binary image, and marking a candidate location when the line components along the slope exceed a line threshold. In various embodiments, the instructions further cause the processor to generate an image patch with the candidate location at the center of the image patch and classify the image patch using a machine learning classifier.

In various embodiments, the at least one filter includes at least one of a Gabor filter and a pyramid filter.

In various embodiments, converting the image to a binary image includes determining an average image intensity and a standard deviation of the filtered image, calculating a binary threshold based on the average image intensity and standard deviation, and converting the filtered image to the binary image according to the binary threshold.

In various embodiments, the line threshold is equal to 70% of the total line components along the slope.

In various embodiments, the image patch is generated using the input image.

In various embodiments, the machine learning classifier comprises a support vector machine.

In various embodiments, the instructions further cause the processor to extract a feature vector from the image patch, wherein the feature vector comprises at least one image moment.

In various embodiments, the instructions further cause the processor to normalize the input image.

In various embodiments, a method for identifying Mura in a display includes generating a filtered image by preprocessing an input image of a display using at least one filter and identifying a line Mura candidate. In various embodiments, identifying a line Mura candidate includes converting the filtered image to a binary image, counting line components along a slope in the binary image, and marking a candidate location when the line components along the slope exceed a line threshold. In various embodiments, the method further includes generating an image patch with the candidate location at the center of the image patch and classifying the image patch using a machine learning classifier.

In various embodiments, the at least one filter comprises a Gabor filter and a Gaussian pyramid filter.

In various embodiments, converting the image to a binary image includes determining an average image intensity and a standard deviation of the filtered image, calculating a binary threshold based on the average image intensity and standard deviation, and converting the filtered image to the binary image according to the binary threshold.

In various embodiments, the line threshold is equal to 70% of the total line components along the slope.

In various embodiments, the image patch is generated using the input image.

In various embodiments, the machine learning classifier comprises a support vector machine.

In various embodiments, the method further includes extracting a feature vector the image patch, wherein the features vector comprises at least one image moment.

In various embodiments, a method for identifying Mura in a display includes normalizing an input image of a display to a desired data range, generating a filtered image by preprocessing the normalized input image using a Gabor filter and a Gaussian pyramid filter and identifying a line Mura candidate. In various embodiments, identifying a line Mura candidate includes converting the filtered image to a binary image according to a binary threshold, counting line components along at least one slope in the binary image, and marking a candidate location when the line components along the at least one slope exceed a line threshold. In various embodiments, the method further includes generating at least one image patch with the candidate location at the center of the image patch and classifying the at least one image patch using a machine learning classifier.

In various embodiments, converting the image to a binary image includes determining an average image intensity and a standard deviation of the filtered image and calculating the binary threshold based on the average image intensity and standard deviation, and converting the filtered image to the binary image according to the binary threshold.

In various embodiments, the binary threshold is equal to the average image intensity plus the standard deviation divided by 1.5.

In various embodiments, the machine learning classifier comprises a support vector machine.

In various embodiments, the method further includes extracting a feature vector the image patch, wherein the features vector comprises at least one image moment.

BRIEF DESCRIPTION OF THE DRAWINGS

Some embodiments can be understood in more detail from the following description taken in conjunction with the accompanying drawings, in which.

DETAILED DESCRIPTION

Embodiments of the present disclosure include a system and method for Mura detection on a display. In various embodiments, the system is configured to identify instances of horizontal line Mura. In various embodiments, an input image of a display showing a test image is received. The input image is then divided into image patches. In various embodiments, the system may preprocess the image using a candidate detector that identifies regions of the display with defect candidates (e.g. horizontal lines) and generates the image patches based on the locations of the defect candidates. The system then classifies the image patches using a machine learning classifier as having or not having an instance of horizontal line Mura.

Figure 1A:
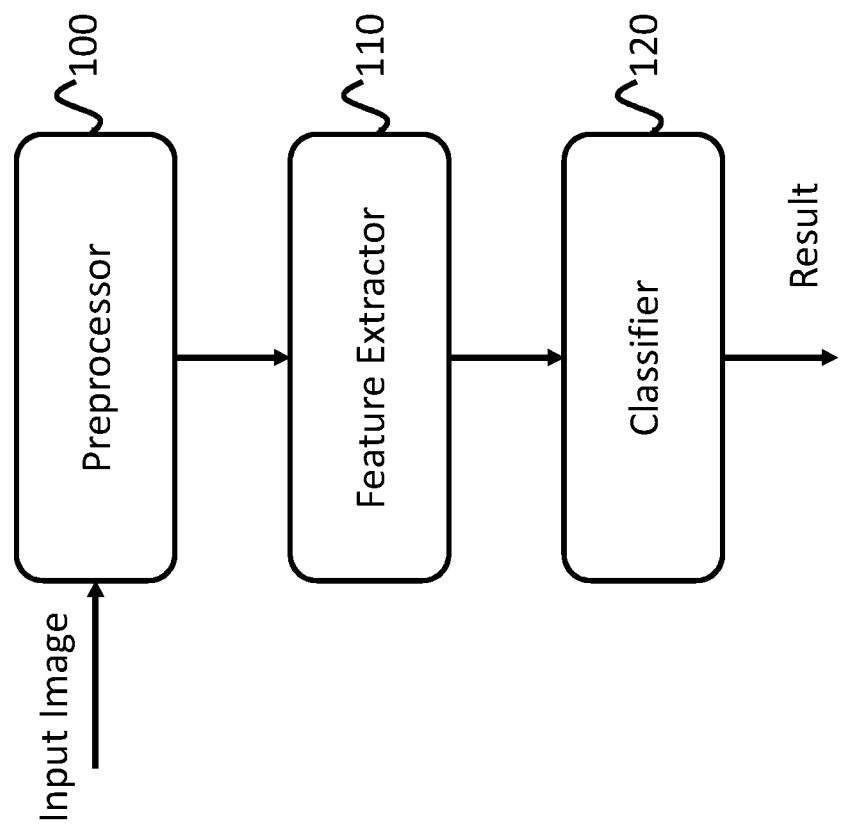
FIG. 1A depicts a system overview according to various embodiments of the present disclosure.
Figure 1B:
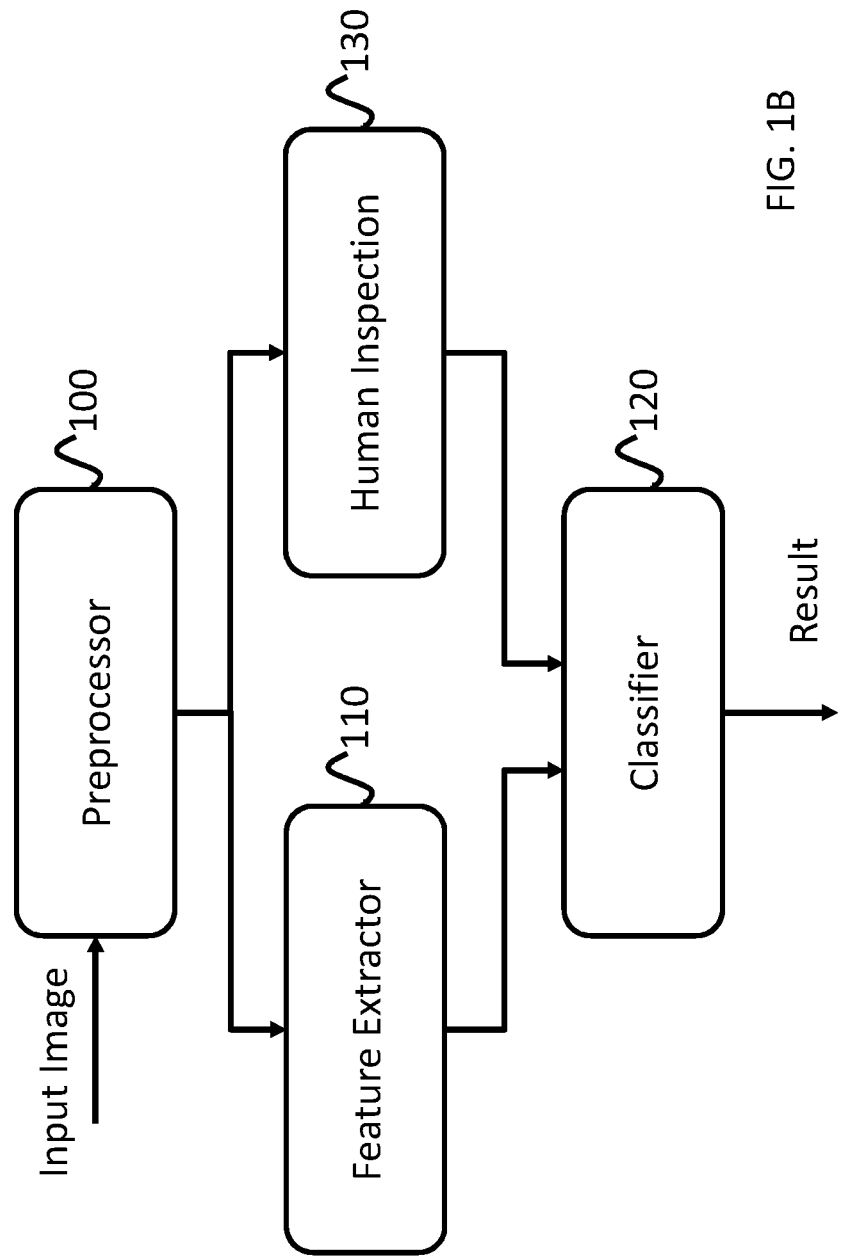
FIG. 1B depicts a system overview for training the classifier according to various embodiments of the present disclosure.
Figure 2:
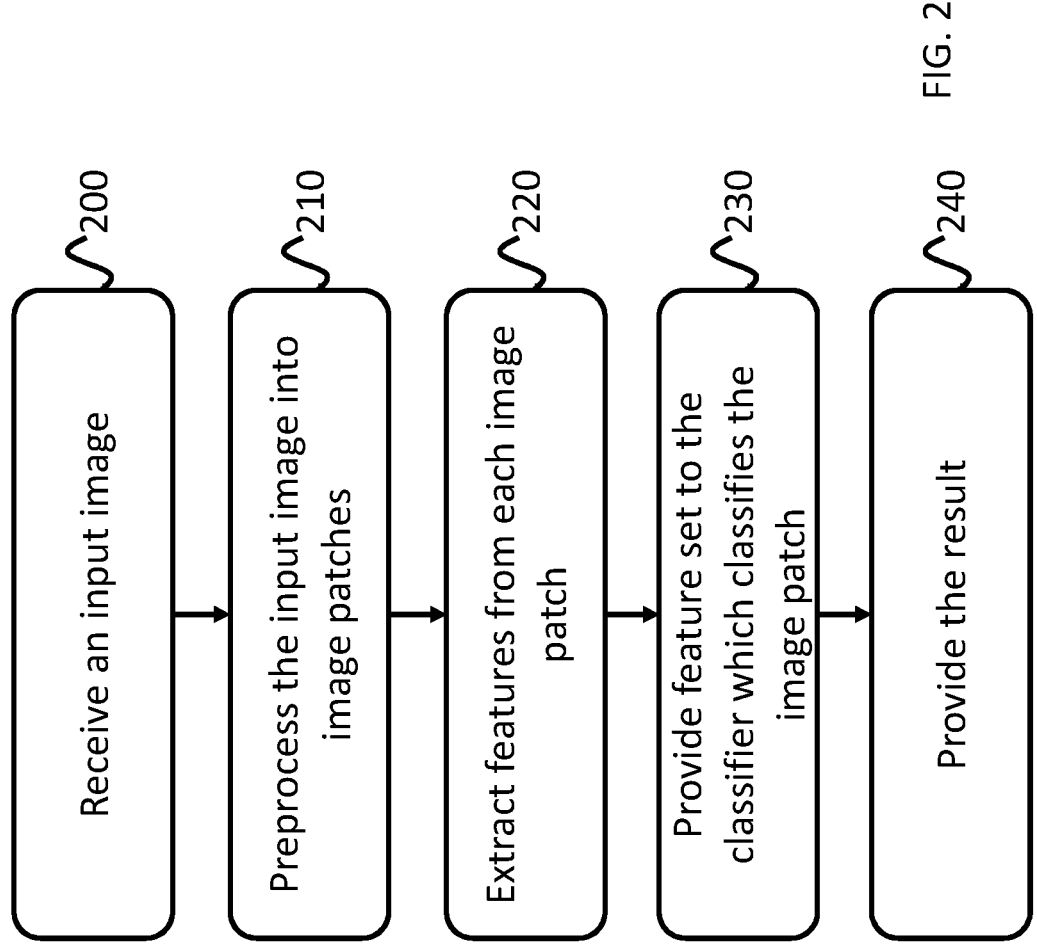
FIG. 2 depicts a method of classifying images according to various embodiments of the present disclosure.

FIG. 1A depicts a system overview according to various embodiments of the present disclosure. FIG. 1B depicts a system overview for training the classifier according to various embodiments of the present disclosure. FIG. 2 depicts a method of classifying images according to various embodiments of the present disclosure.

Referring to FIGS. 1A, 1B, and 2, in various embodiments, the Mura detection system receives an input image at a preprocessor 100 (200). The input image may, for example, include an image of a display that is showing a test image. A camera may be used to generate a test image by taking a picture of the OLED displaying a test image. In various embodiments, the test image may include an image that is likely to cause a display to exhibit instances of horizontal line Mura. For example, the test image may be a uniform image exhibiting low levels of contrast. The input image may also be of high enough resolution to show the individual pixels of the display being inspected for defects (e.g. line Mura). In various embodiments, the preprocessor 100 may be configured to receive the input image and perform smoothing to reduce the noise in the image. After reducing the noise in the input image, the preprocessor 100 may be configured to divide the image into a plurality of image patches (210). Each of the image patches may then be supplied to a feature extractor 110.

In various embodiments, the feature extractor 110 is configured to calculate various statistical features for a supplied image patch (220). For example, the statistical features may include one or more image moments (e.g. a weighted average of pixels' intensities), one or more texture measurements (e.g. texture analysis using a Gray-Level Co-Occurance Matrix (GLCM)), or any other statistical feature of the input image. For example, in various embodiments, contrast, correlation, energy, homogeneity from GLCM, and moments such as mu03, mu10, hu1, hu5 are extracted by the feature extractor 110.

In various embodiments, the statistical features of each image patch extracted are supplied as input to the classifier 120 (230). In various embodiments, the classifier 120 is a machine learning classifier that uses the extracted features (e.g. a feature vector) and label class information to identify instances of defects (e.g. Mura) (240). In various embodiments, the class information is supplied by training the classifier.

In various embodiments, the classifier utilizes a supervised learning model and therefore is trained before being functional. In some embodiments, the supervised learning model used in the classifier 120 is a support vector machine. The supervised learning model (e.g. the support vector machine) may be trained by providing human input 130 to the classifier 120 during the training phase. For example, for each image patch, a human may visually inspect the patch and mark any instances of white spot Mura. The image patches are also provided to the feature extractor 110. The feature vector extracted for the image patch and the corresponding human inspected and marked patch are both provided to the classifier 120. The classifier 120 utilizes these provided patches to generate class information (i.e. builds a model) for later use in classification.

Figure 3A:
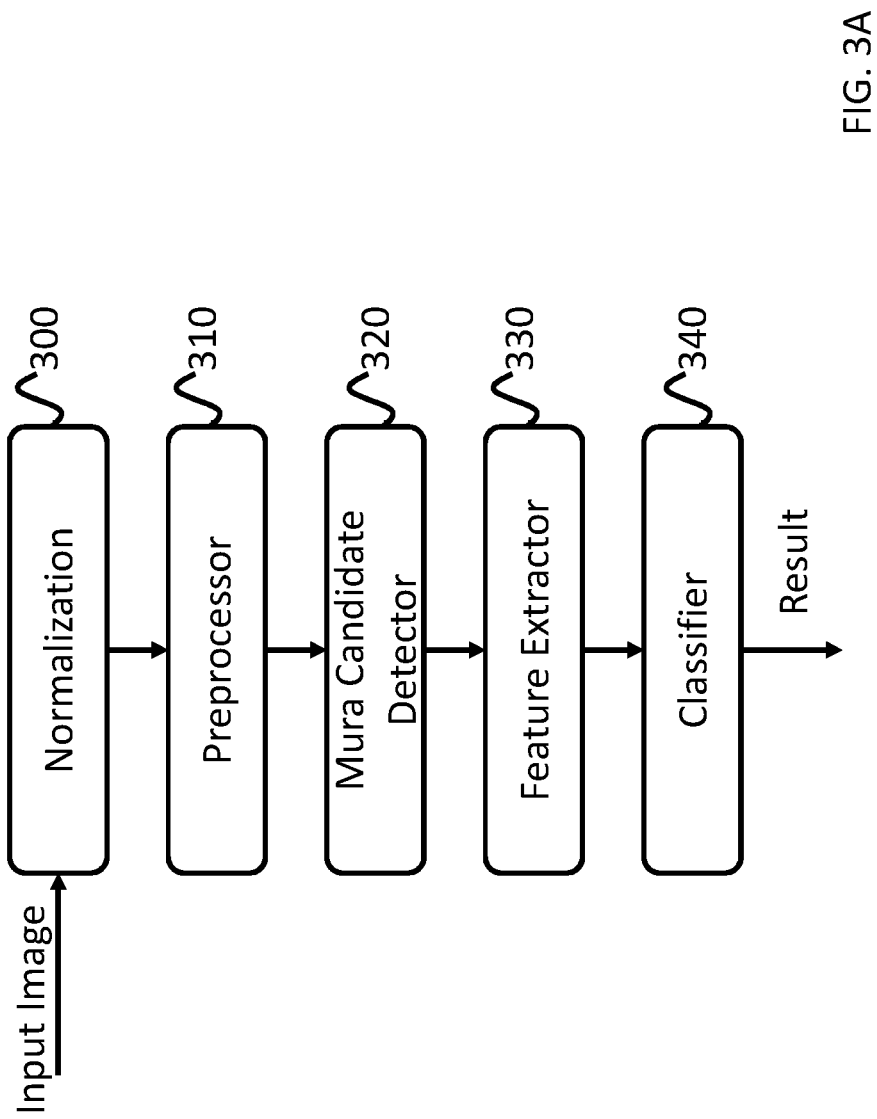
FIG. 3A depicts a system overview according to various embodiments of the present disclosure.
Figure 3B:
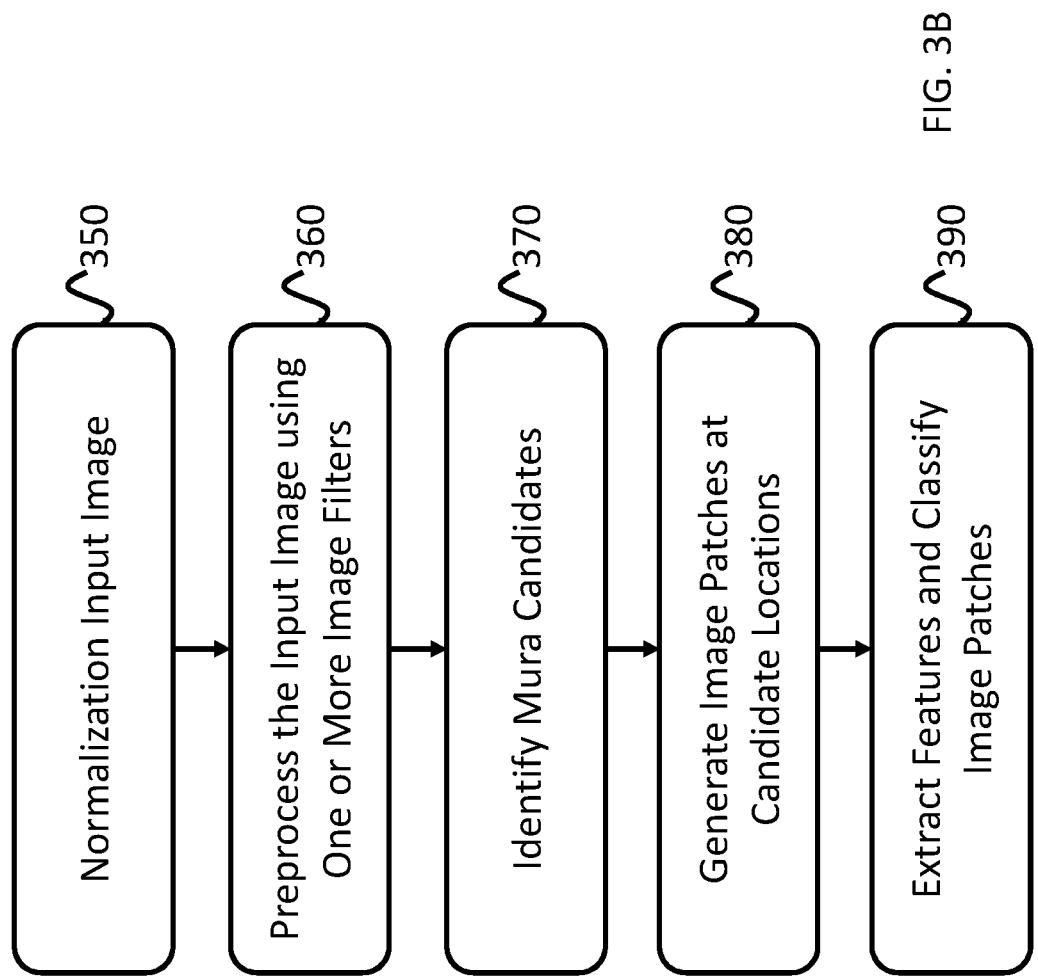
FIG. 3B depicts a method of classifying images using the system of FIG. 3A according to various embodiments of the present disclosure.

FIG. 3A depicts a system overview according to various embodiments of the present disclosure. FIG. 3B depicts a method of classifying images using the system of FIG. 3A according to various embodiments of the present disclosure.

Referring to FIGS. 3A and 3B, in various embodiments, a line Mura classification system may utilize preprocessing and candidate detection for identifying potential instances of line Mura. Preprocessing and using a candidate detector may reduce the total number of image patches analyzed by the classifier at the expense of increasing pre-classification processing time. Despite the increase in pre-classification processing time, the overall runtime may be significantly reduced due to the subsequent decrease in classification time. For example, when compared to sliding window image patch generation techniques, the total processing time may be reduced by an order of magnitude due to the reduction in images needed to be classified. Additionally, using preprocessing and candidate detection may also improve classifier training. For example, in various embodiments, the reduction in image patches allows for human intervention during training to be reduced thereby reducing human errors being provided to the classifier.

In various embodiments, the system receives a input image at a normalization module 300. In various embodiments, the input image is normalized to a desired data range (350). For example, in various embodiments, the normalization may be a linear normalization as described by equation 1.

$$I_{norm} = \frac{(g\text{Max} - I_{input})}{(g\text{Max} - g\text{Min})} \quad (1)$$

Where gMax and gMin are the global maximum and minimum for the entire image dataset, $I_{input}$ is the input image, and $I_{norm}$ is the normalized image. In this example, the normalization results in the image intensity being inverted.

In various embodiments, the normalized image is provided to the preprocessor 310 which filters the image using one or more filters to make any instances of defects (e.g horizontal line Mura) become more apparent while also reducing image noise (360). For example, in various embodiments, the one or more filters may be configured to converge energy in an image towards a center line. In various embodiments, the preprocessed image is provided to the Mura candidate detector 320 which identifies potential Mura candidates (370) and generates image patches at the candidate locations (380). In various embodiments, the image patches are generated with the potential Mura candidates located at the center of each patch. The image patches are provided to the feature extractor 330 which generates a feature vector (e.g. as described above) for each image patch and a classifier 340 uses each feature vector to classify each image patch (380).

Figure 4:
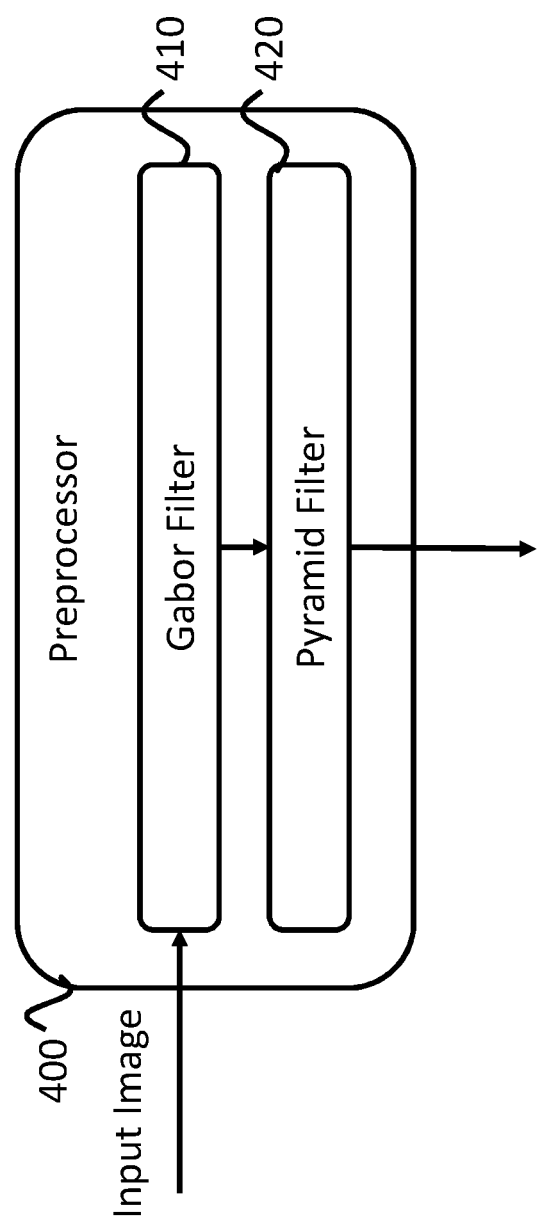
FIG. 4 depicts a preprocessor according to various embodiments of the present disclosure.

FIG. 4 depicts a preprocessor according to various embodiments of the present disclosure.

Referring to FIG. 4, in various embodiments, the preprocessor 400 is configured to filter a normalized image to enhance line Mura features to assist in candidate detection and classification. For example, in various embodiments, the preprocessor 400 may be configured to remove noise and converge energy towards center lines. In various embodiments, the preprocessor includes a Gabor filter 410 and a pyramid filter 420. Gabor filters are used to analyze an image's frequency content in a specific directions (e.g. the angle theta). In various embodiments, the Gabor filter 410 may be adjusted with different values of theta to detect the different angles of line Mura. For example, line Mura may not be limited to perfectly horizontal or vertical orientations. Thus, the Gabor filter 410 may be utilized more than once on an image and use different parameters. For example, a horizontal line may be tilted more than 1 degree. In various embodiments, the Gabor filter may include a value for theta of 1 degree along with values that include sigma equal to 4, lamda equal to nineteen, and gamma equal to 0.5. The parameters (e.g. theta, sigma, lamda, and gamma) of the Gabor filter 410 may be also be further adjusted to filter different frequencies or other factors. In various embodiments, the filter size may also be adjusted. For example, in various embodiments, the Gabor filter 410 may have a size of 31×31 pixels. Adjustments to filter parameters may be done automatically through an iterative process or modified by a user.

In various embodiments, the pyramid filter 420 may be configured to increase image smoothing at the expense of image resolution. In various embodiments, the pyramid filter 420 is a Gaussian pyramid filter (e.g. a multiple resolution Gaussian pyramid filter). For example, in various embodiments the Gaussian pyramid filter 420 may be used to generate a Gaussian pyramid for the preprocessed input image for four levels. A 5×5 window filter may then be applied to each level and the levels may be merged back to a single filtered image. In various embodiments, the number of levels and size of the window filter may be adjusted according to the input image size. In various other embodiments, other types of pyramid filters may be used. For example, in various other embodiments, the pyramid filter may be a Laplacian pyramid filter, a Steerable pyramid filter, or other type of pyramid filter. In various other embodiments, the pyramid filter 420 may be replaced by one or more other filters that have a similar effect on the input image. For example, in various embodiments, the pyramid filter 420 may be replaced by multiple Gaussian smoothing filters. The Gaussian smoothing filters may each have different distributions and the output of each of the Gaussian smoothing filters is averaged.

Figure 5:
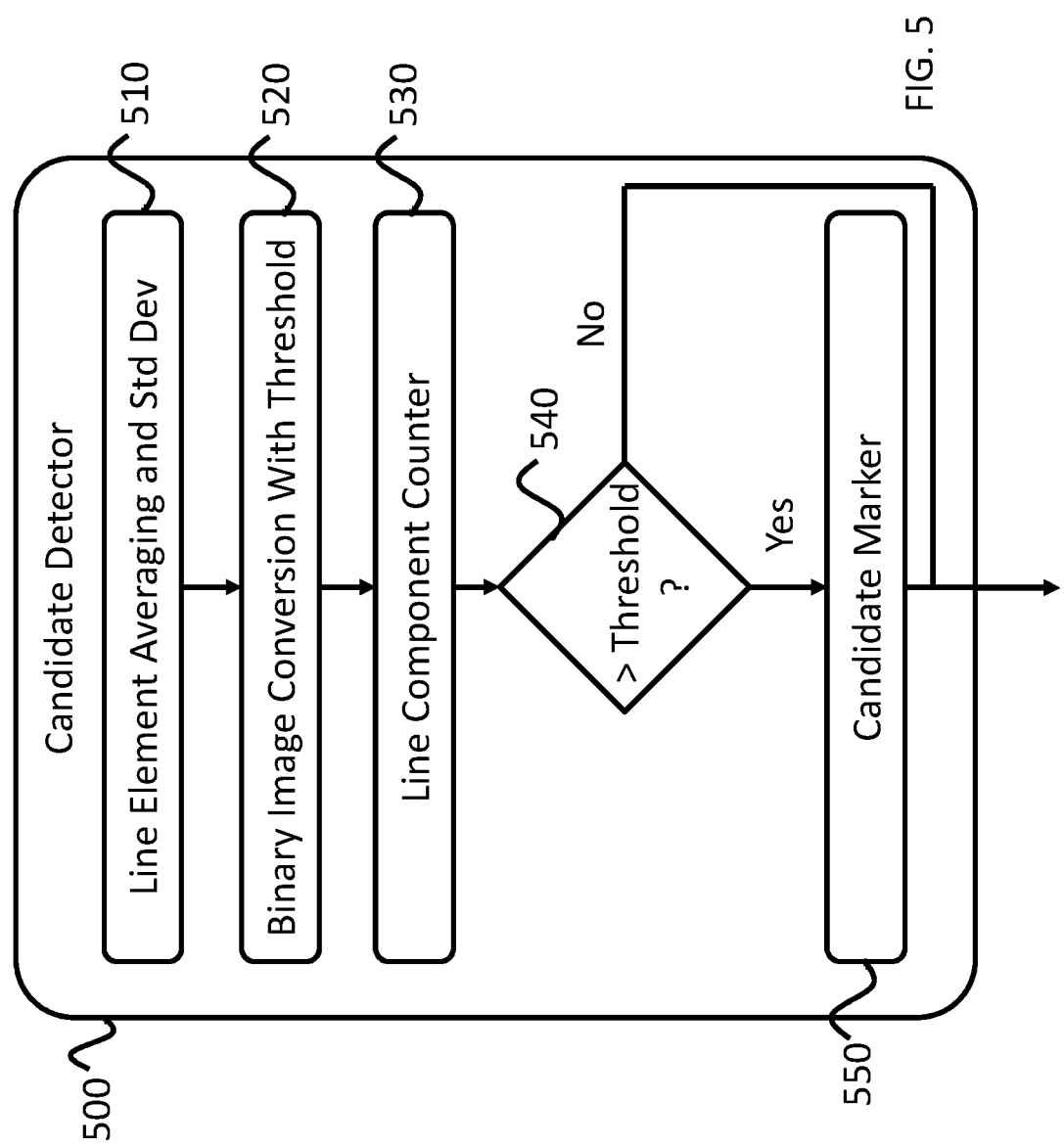
FIG. 5 depicts a candidate detector according to various embodiments of the present disclosure.

FIG. 5 depicts a candidate detector according to various embodiments of the present disclosure.

Referring to FIG. 5, a candidate detector 500 may be utilized to identify potential instances of line Mura (e.g. horizontal line Mura). In various embodiments, the candidate detector 500 is configured to count binary image components along a line. A potential instance of line Mura is identified when the number of components along the line are greater than a line threshold. In various embodiments, the candidate detector 500 may include an average and standard deviation module 510 which determines average image intensity and standard deviation. In various embodiments, a binary conversion module 520 converts the input image to a binary image. The binary conversion module 520 may use a binary threshold value set at the average modified by the standard deviation. For example, in various embodiments, the threshold may be defined by equation 2.

$$\text{Binary Threshold} = \text{average} + \frac{\text{Standard Deviation}}{1.5} \quad (2)$$

In various embodiments, the candidate detector 500 may use the binary image to identify potential instances of line Mura. For example, a line counting module 530 may count the length of line segments along a slope (e.g. components marked "1" along a slope). For example, in various embodiments, the line counting module 530 may, for each line in the input image, count the number of segments marked "1" in the binary image across a slope of zero (e.g. a horizontal line). In another example, the line counting module 530 may count along a slope of ±0.5, ±1.0, ±1.5 and so on. In various embodiments, a candidate may be detected when the number of counted line segments along a slope exceed a line threshold. In various embodiments a threshold comparison module 540 compares each of the counted line components to a corresponding line threshold for the relevant slope. For example, the line threshold may be set to 70% of the line components along a slope. A qHD display has a resolution of 2560×1440. Thus, in this example, for a horizontal line (e.g. a slope of 0) the line threshold may be set at 1000 components. In various embodiments, a candidate marker 550 marks the location and orientation of each identified candidate. An image patch may then be generated for each identified candidate using the original image and provided to feature extractor and classifier as described above. In various embodiments, the size of the image patch may be determined based on the display size. For example, in various embodiments, the display may be a QHD display having 2560×1440 resolution and the image patches may have a size of 43×1408 pixels. In other embodiments, the display may have a 1480×720 resolution and the image patches may have a size of 21×704 pixels.

Accordingly, the above described embodiments of the present disclosure provide a system and method for identifying instances of line Mura on a display panel. In various embodiments, preprocessing and candidate detection may reduce the number of candidate image patches classified and thereby reduce the total processing time while increasing detection accuracy. Image patches may be generated with Mura candidates located at the center of the patches and by creating patches with the line at the center of the patch, the system provides for a clear dataset for both training and classification.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

What is claimed is:

1. A system for identifying Mura in a display, the system comprising:
a memory;
a processor configured to execute instructions stored on the memory that, when executed by the processor, cause the processor to:
generate a filtered image by preprocessing an input image of a display using at least one filter;
identify a line Mura candidate by:
converting the filtered image to a binary image;
counting line components along a slope in the binary image; and
marking a candidate location in response to the line components along the slope exceeding a line threshold;
generate an image patch with the candidate location at the center of the image patch; and
classify the image patch using a machine learning classifier.

2. The system of claim 1, wherein the at least one filter comprises at least one of: a Gabor filter and a pyramid filter.

3. The system of claim 1, wherein converting the filtered image to the binary image comprises:
determining an average image intensity and a standard deviation of the filtered image;
calculating a binary threshold based on the average image intensity and standard deviation; and
converting the filtered image to the binary image according to the binary threshold.

4. The system of claim 1, wherein the line threshold is equal to 70% of total line components along the slope.

5. The system of claim 1, wherein the image patch is generated using the input image.

6. The system of claim 1, wherein the machine learning classifier comprises a support vector machine.

7. The system of claim 1, wherein the instructions further cause the processor to extract a feature vector from the image patch, wherein the feature vector comprises at least one image moment.

8. The system of claim 1, wherein the instructions further cause the processor to normalize the input image.

9. A method for identifying Mura in a display comprising:
generating a filtered image by preprocessing an input image of a display using at least one filter;
identifying a line Mura candidate, wherein identifying a line Mura candidate comprises:
converting the filtered image to a binary image;
counting line components along a slope in the binary image; and
marking a candidate location in response to the line components along the slope exceeding a line threshold;
generating an image patch with the candidate location at the center of the image patch; and
classifying the image patch using a machine learning classifier.

10. The method of claim 9, wherein the at least one filter comprises a Gabor filter and a Gaussian pyramid filter.

11. The method of claim 9, wherein converting the filtered image to the binary image comprises:
determining an average image intensity and a standard deviation of the filtered image;
calculating a binary threshold based on the average image intensity and standard deviation; and
converting the filtered image to the binary image according to the binary threshold.

12. The method of claim 9, wherein the line threshold is equal to 70% of total line components along the slope.

13. The method of claim 9, wherein the image patch is generated using the input image.

14. The method of claim 9, wherein the machine learning classifier comprises a support vector machine.

15. The method of claim 9, further comprising extracting a feature vector the image patch, wherein the features vector comprises at least one image moment.

16. A method for identifying Mura in a display comprising:
normalizing an input image of a display to a desired data range;
generating a filtered image by preprocessing the normalized input image using a Gabor filter and a Gaussian pyramid filter;
identifying a line Mura candidate, wherein identifying a line Mura candidate comprises:
converting the filtered image to a binary image according to a binary threshold;
counting line components along at least one slope in the binary image; and
marking a candidate location in response to the line components along the at least one slope exceeding a line threshold;
generating at least one image patch with the candidate location at the center of the image patch; and
classifying the at least one image patch using a machine learning classifier.

17. The method of claim 16, wherein converting the filtered image to the binary image comprises:
determining an average image intensity and a standard deviation of the filtered image;
calculating the binary threshold based on the average image intensity and standard deviation; and
converting the filtered image to the binary image according to the binary threshold.

18. The method of claim 17, wherein the binary threshold is equal to the average image intensity plus the standard deviation divided by 1.5.

19. The method of claim 16, wherein the machine learning classifier comprises a support vector machine.

20. The method of claim 16, further comprising extracting a feature vector the image patch, wherein the features vector comprises at least one image moment.

* * * * *